Oct. 7, 1952  H. E. WILTSEY  2,612,785
VARIABLE-SPEED TRANSMISSION
Filed June 28, 1950  3 Sheets-Sheet 1

INVENTOR.
HOWARD E. WILTSEY
Emerson B Donnell

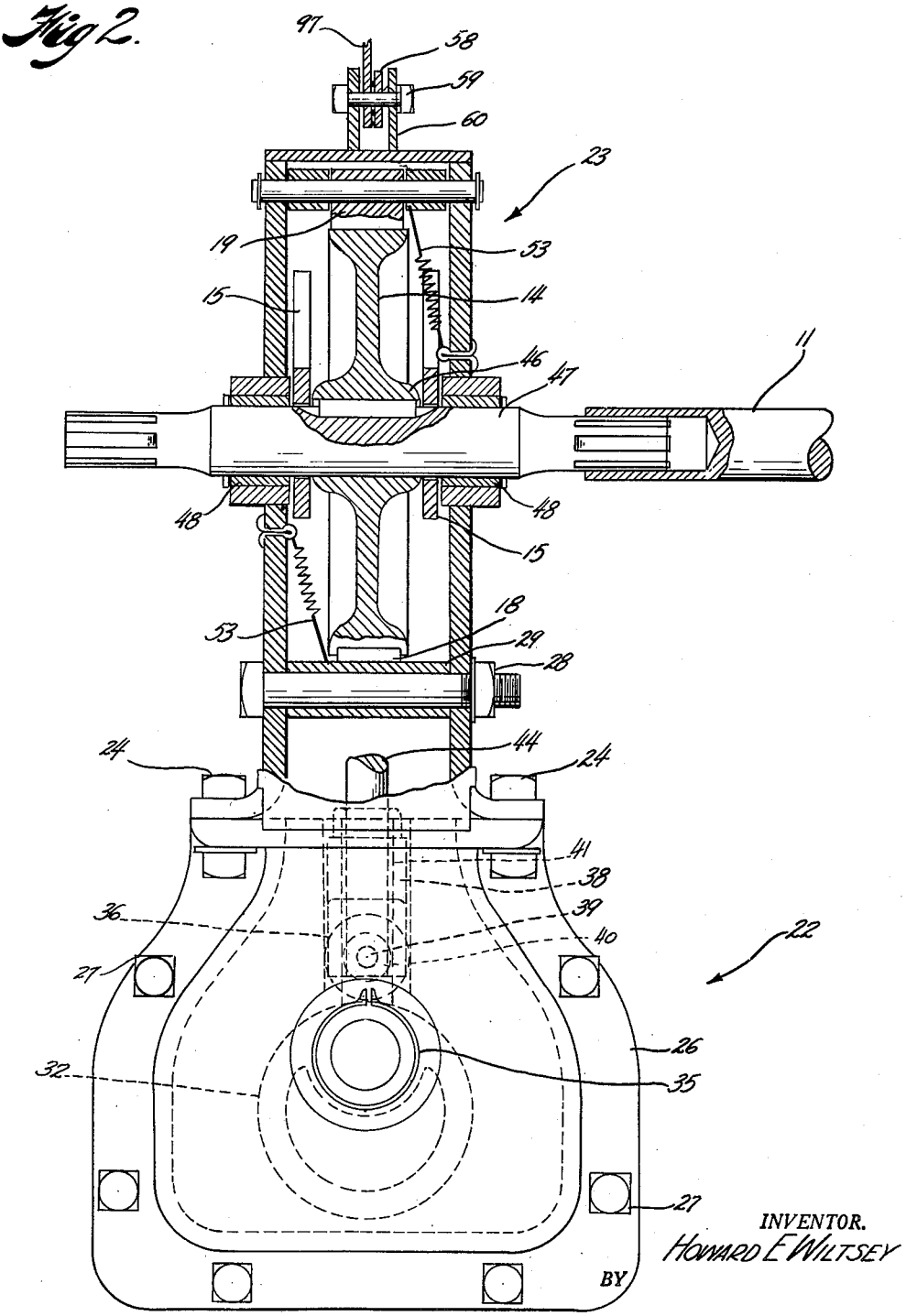

Oct. 7, 1952          H. E. WILTSEY          2,612,785
VARIABLE-SPEED TRANSMISSION
Filed June 28, 1950          3 Sheets—Sheet 3
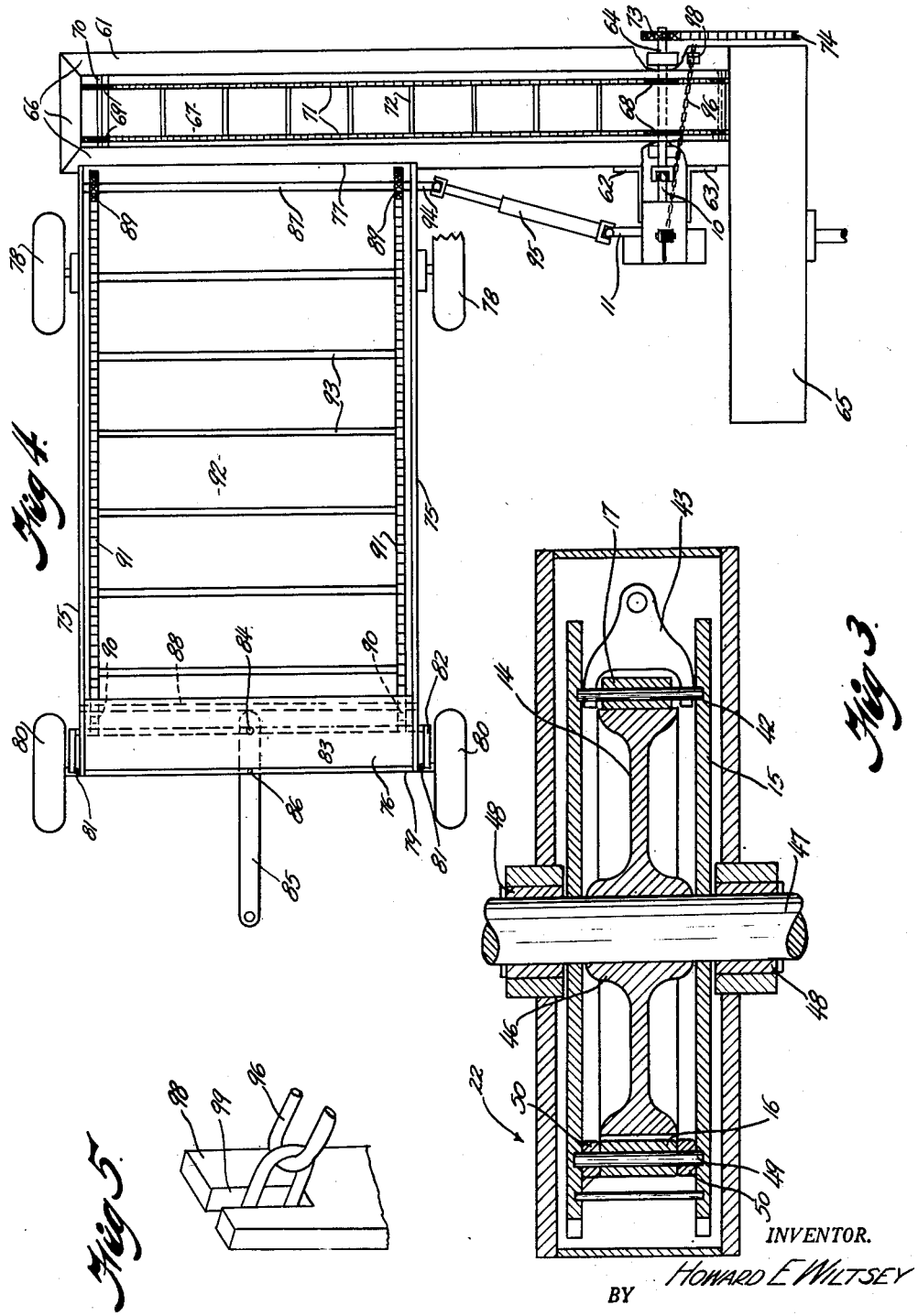
INVENTOR.
HOWARD E WILTSEY
BY
Emerson B Donnell Patented Oct. 7, 1952

2,612,785

UNITED STATES PATENT OFFICE 2,612,785

VARIABLE-SPEED TRANSMISSION

Howard E. Wiltsey, Racine, Wis., assignor to J. I. Case Company, Racine, Wis., a corporation of Wisconsin Application June 28, 1950, Serial No. 170,870

4 Claims. (Cl. 74—124)

The present invention relates to variable speed transmissions for transforming uniform continuous motion into intermittent motion at easily changeable rates, and has special utility as a wagon unloader when attached to a conveyor or forage blower at its source of power for automatically unloading a wagon into the conveyor or forage blower.

An object of the present invention is to generally improve the operation and construction of devices of this type.

A further object of the present invention is to provide a transmission including a driving cam, a ratchet wheel, and a follower assembly for imparting the lift of the driving cam to the ratchet wheel, with improved means for directing the reciprocatory motion of the follower assembly along a predetermined path.

Referring to the drawings:

Fig. 2 is a side-elevation of the transmission shown in Fig. 1 partly in section on the line 2—2 of Fig. 1 to show the ratchet wheel construction.

Fig. 3 is a substantially horizontal section taken on the line 3—3 of Fig. 1.

Fig. 4 is a diagrammatic plan view slightly reduced in size illustrating the transmisson used as a wagon unloader for automatically unloading a wagon into the conveyor of a forage blower or the like.

Fig. 5 is a perspective view slightly enlarged, of a means for establishing and maintaining the several rates of motion of which the transmission is capable.

Figure 1:
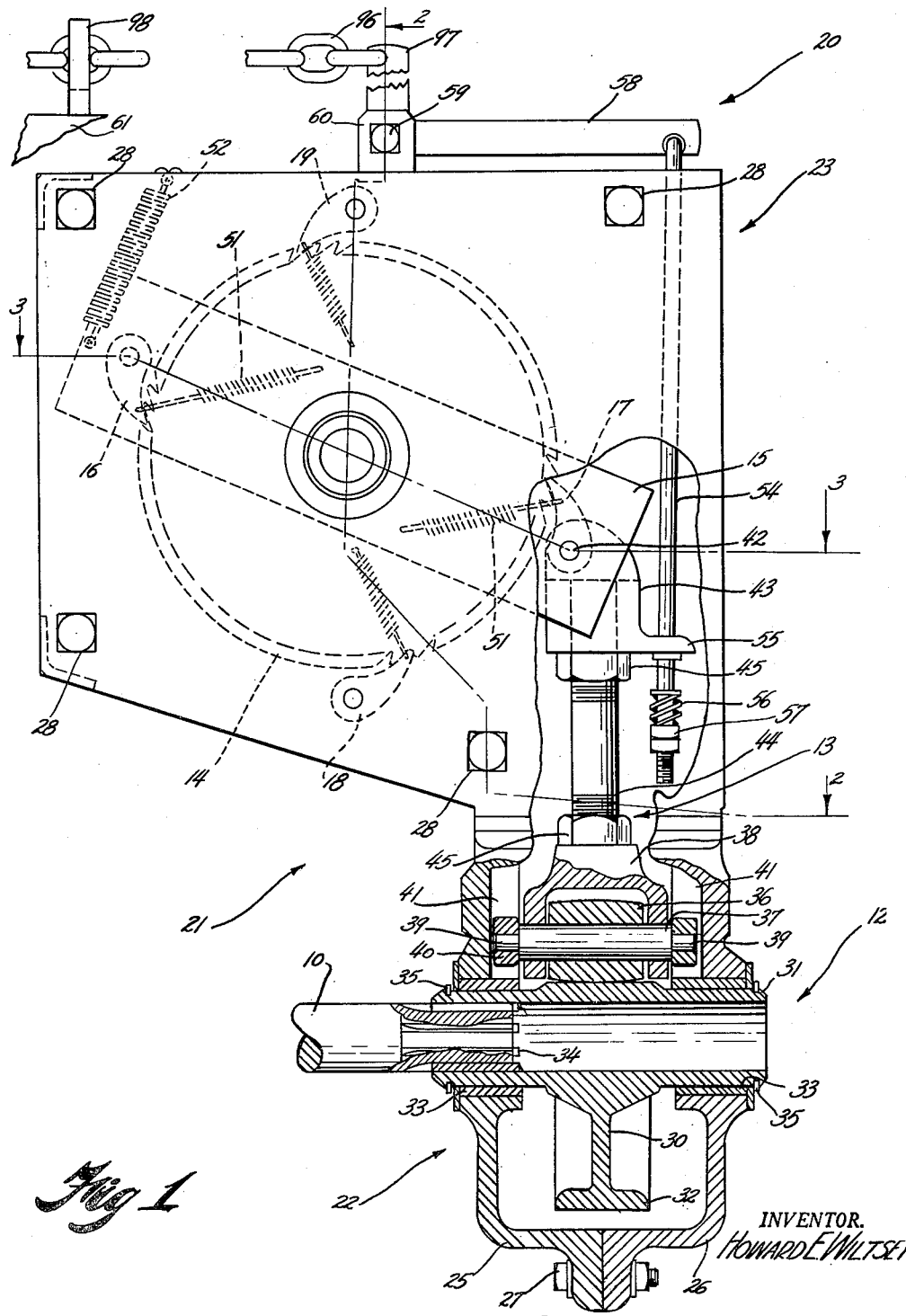
Fig. 1 is a front elevation of a transmission embodying the present invention with parts broken away to show the driving cam and follower assembly construction.

In the illustrative embodiment of the invention set forth in the accompanying drawings and hereinafter described in detail, my improved variable speed transmission is used for transforming the constant rotary motion of a driving shaft 10 to intermittent motion directed to a driven shaft 11. For transforming constant rotary motion into intermittent motion, the transmission comprises, in the present instance, a driving cam assembly 12 for imparting oscillatory motion to a follower assembly 13 which in turn drives a ratchet wheel 14 in one direction by means of rockable levers 15 and driving pawls 16 and 17 backward motion being prevented by holding pawls 18 and 19. It will be seen in the drawings that the pawls are positioned with respect to the ratchet wheel 14 so that when one driving pawl and one holding pawl are in mesh with the peripheral teeth of the ratchet wheel 14, the other driving pawl and holding pawl are a half tooth out of mesh with the peripheral teeth of the ratchet wheel, which as will be fully explained hereinafter, permits the transmission to direct a very slow rate of intermittent motion to the driven shaft 11 independently of the speed of the constantly rotating shaft 10 while still retaining a ratchet wheel having teeth large enough to insure ample strength for the purposes for which the transmission is intended.

For regulating the speed of the intermittent motion directed to the driven shaft 11 independently of the speed of the constantly rotating shaft 10, a regulating means 20 is provided for selectively positioning the follower assembly with respect to the driving cam assembly 12 for controlling the degree of oscillation imparted to the follower as will be fully explained hereinafter.

The transmission is enclosed, in the present instance, in an enclosure 21 including a casing 22 and a housing 23 which are secured one to the other as by bolts or the like 24. The casing 22 is formed of sections 25 and 26, as seen in Fig. 1, secured together as by bolts 27 or the like, which construction, as will be appreciated, enables the enclosed mechanism to be easily assembled and disassembled. The housing 23 is fabricated from angle irons and sheet metal or other suitable material and maintained in its substantially rectangular cross sectional shape as by bolts 28 and spacers 29.

The driving cam assembly 12 comprises a casting 30 having a tubular shaft 31 and an eccentric cam 32 formed substantially midway between the ends of the tubular shaft 31. The tubular shaft 31 is rotatably carried transversely in the casing 22 in aligned bearings 33—33 for rotation therein. For rotating the tubular shaft 31 for imparting oscillatory motion to the follower assembly 13 by means of the cam 32, one end of the tubular shaft is provided with an internal spline, or the like 34, for non-rotatably accommodating therein the driving shaft 10. Lock rings 35 are secured adjacent the ends of the tubular shaft 31 for preventing axial displacement of the casting 30 in the bearings 33—33.

Engageable with the peripheral surface of the cam 32, is a roller 36 of the follower assembly 13. The roller 36 is freely rotatably journaled on a shaft 37 which in the present instance is freely rotatably carried by downwardly extending arms, as seen in Fig. 1, of a yoke 38. For guiding the upward displacement of the follower assembly 13 upon oscillation by the driving cam assembly 12, spindles 39 are formed on the ends of the shaft 37 laterally of the arms of the yoke 38 for freely rotatably carrying guide rollers 40 which in turn are accommodated in aligned guideways or recesses 41 formed in the casing 22 so as to roll therein. It will be noticed in the drawings that the guideways 41 are formed so as to position the shaft 37 so that its axis is in a plane substantially parallel to the tubular shaft 31 and normal to a pivot 42 to be later described, when the peripheral surface of the cam 32 is in intimate contact with the peripheral surface of the roller 36, for effecting thereby substantially uniform acceleration and deceleration of the follower assembly 13 by the cam 32 and for preventing the wedging of the guide rollers 40 in the guideways 41. It should also be noted that the guideways 41 are of sufficient size to permit the rollers 40 to roll freely up and down therein, Fig. 1, lateral displacement of the guide rollers 40 and consequently of the roller 36 within the guideways cannot be effected sufficiently to move the rollers 36 out of position with respect to the periphery of the cam 32. Axial movement of the roller 36 on the shaft 37 is limited to the distance between the arms of the yoke 38 which in turn are confined between the guide-rollers 40. The upper end of the follower assembly 13 is provided with a forked head 43 which is pivotally secured between the adjacent ends of the rockable levers 15 on above mentioned pivot 42. It will be apparent that when the lift of the cam 32 is imparted to the follower assembly 13, that the follower assembly will have a peculiar rocking motion due to the fact that the head 43 is secured with the rockable levers 15 so as to rock circumferentially about the axis of the ratchet wheel 14. To provide suitable bearing surface on the cam 32 at all times, the roll 36 is substantially barrel-shaped so as to rock sufficiently on the cam 32 to compensate for this rocking motion of the follower assembly. As previously suggested, the rockable levers 15 pivotally carry on opposite sides of the periphery of the ratchet wheel 14 the driving pawls 16 and 17 positioned for engagement with the peripheral teeth of the ratchet wheel as will be further explained. The head 43 is secured with the yoke 38 as by a shaft 44 threaded into the respective ends of the yoke and the head, the proper length for the follower assembly 13 being fixed as by lock nuts 45.

The ratchet wheel 14 includes a hub portion 46 which surrounds and is keyed or otherwise suitably fixed to a driven shaft 47 which in turn is rotatably carried transversely in the housing 23 by aligned bearings 48—48. As seen in the drawings, the housing 23 in the present instance is secured with the casing 22 so that a plane through the axis of the shaft 47 substantially normal to the horizontal intersects a plane through the axis of the tubular shaft 31 substantially normal to the horizontal substantially at right angles, so that the follower assembly is positioned at one side of the periphery of the ratchet wheel 14 for rocking the rockable levers 15 for driving the ratchet wheel as will appear. The shaft 47 protrudes laterally from the bearings 48 and is preferably splined or otherwise suitably formed on the ends thereof for attachment of the driven shaft 11 on either end of the shaft 47.

The rockable levers 15 are pivotally carried by the shaft 47 on opposite sides of the ratchet wheel 14 and confined as far as axial displacement on the shaft 47 is concerned between the hub portion 46 and the bearings 48. As previously suggested the levers 15 carry between their adjacent ends on opposite sides of the periphery of the ratchet wheel 14 the driving pawls 16 and 17 which are positioned for engagement with the peripheral teeth thereof. More specifically the pawl 16 is rotatably carried on a pin 49, see Fig. 3, which is carried by the levers 15 and spaced radially from shaft 47. Axial movement of the pawl 16 on the pin 49 is prevented by means of spacers 50. The pivot 42 carried by the opposite ends of levers 15 rotatably carries the pawl 17 and the forked head 43 of the follower assembly 13 therebetween, the pawl 17 being positioned between the arms of the forked head 43 for preventing axial movement thereof. For urging the driving pawls 16 and 17 into engagement with the peripheral teeth of the ratchet wheel 14, tension springs 51 are provided interposed between the levers 15 and the pawls 16 and 17.

It will be seen that as the driving cam assembly rotates, the eccentric cam 32 will impart a uniform acceleration to the follower assembly 13 which motion is imparted to the levers 15 so as to move the ratchet wheel in one direction, as indicated by the arrow, Fig. 1, as by the driving pawls 16 and 17. A tension spring 52 is positioned between the levers 15 and the housing 23 for resiliently maintaining the follower assembly in contact with the periphery of the cam 32. Reverse motion of the ratchet wheel 14 is prevented by the holding pawls 18 and 19 which are rotatably positioned within the housing 23 so as to engage with the peripheral teeth of the ratchet wheel 14. Tension springs 53 are provided for resiliently urging the holding pawls into engagement with the teeth of the ratchet wheel. As has been previously suggested and as seen in Fig. 1, when the driving pawl 17 and the holding pawl 18 are engaged with the peripheral teeth of the ratchet wheel, the driving pawl 16 and the holding pawl 19 are substantially a half tooth out of engagement with the teeth of the ratchet wheel, which arrangement permits variations in the speed of rotation of the driven shaft corresponding to a rotation of the ratchet wheel equal to one-half the pitch of the teeth thereof per revolution of the driving cam 32 which accordingly permits a very fine speed variation to be obtained with a ratchet wheel of comparatively course pitch. It should be recognized that this type of multiple pawl arrangement is conveniently employed in transmissions wherein the relative motion between the driving pawls and the ratchet wheel for engaging the pawls with successive teeth is less than the pitch of the teeth. While the motion of the ratchet wheel that is necessary for engaging the pawls with successive teeth thereon may be reduced by making the pitch of the ratchet smaller for imparting a slow intermittent motion to the driven shaft 11 independently of the speed of the constantly rotating shaft 10, this weakens the teeth and is not always desirable in transmissions of this type. It should be understood, however, that while this multiple pawl arrangement disclosed in the drawings is preferable, I do not intend to limit my invention thereto, it being recognized that any suitable pawl arrangement is adaptable to be employed with the disclosed transmission.

To procure variations in speed of the driven shaft 11 while still permitting the use of a constant speed motor or prime mover for imparting the rotary motion to the driving shaft 10, I have provided the regulating means 20 as previously suggested, by which through simple manual adjustments a number of different operating speeds can readily be obtained. To accomplish this, I provide in the present instance, control rod 54 slidably passed through holes formed in a lateral extension 55 of the head 43 and the housing 23 so as to position the control rod substantially parallel to the follower assembly 13. A compression spring 56 is provided on rod 54 between the lateral extension 55 of the head 43 and adjustment nuts 57 and which is engaged by extension 55 upon downward movement when less than a full stroke of assembly 13 is desired. Spring 56 is for absorbing the shock of the follower assembly 13 during deceleration of the follower when the full lift of the cam 32 is not utilized.

The upper end of control rod 54 is pivotally secured to a rockable arm 58 which is pivotally secured with the housing 23 on a pivot 59 carried in a bracket 60 for raising or lowering the control rod 54. Suitable means are provided for maintaining the rockable arm 58 when the correct position for the control rod 54 has been found, one of such means being illustrated and described in connection with Figs. 4 and 5. By raising or lowering the control rod 54, the return or deceleration of the follower assembly 13 is controlled and consequently its contact through the roller 36 with the cam 32 is likewise controlled. It should be apparent that the control rod can be positioned so that the full lift of the cam 32 is imparted to the follower assembly 13 or it can be positioned so that only a portion of the lift of the cam 32 will be imparted to the follower assembly 13 as by limiting the return of the follower assembly so that only a portion of the cam 32 comes in contact with the roller 36. When it is desirable to stop the motion of the driven shaft 11 independently of the rotation of the driving shaft 10, the roller 36 can be held sufficiently away from the center of the cam 32 so that the periphery of the cam will not come in contact with the roller when the cam is revolved and consequently so that the follower assembly will not rock the levers 15. In the specific embodiment illustrated in the drawings, it is possible to obtain variations in speed of the driven shaft 11 independently of the speed of the driving shaft 10 from a rotation of the ratchet wheel equal to one-half tooth of the ratchet wheel per complete revolution of the cam 32 to a rotation of the ratchet wheel equal to three and one-half teeth of the ratchet wheel at one-half tooth intervals per revolution of the cam 32 but it should be understood that different speed variations are possible, depending upon the use to which the transmission is to be put, the size of the ratchet wheel that is employed, and the pitch of the peripheral teeth thereof.

While I have shown an eccentric cam for use with this transmission it should be recognized that the use of this type of cam is only preferable and any type of cam which will impart a suitable oscillatory motion to the follower assembly can be employed.

Fig. 4 illustrates the use of my variable speed transmission as a wagon unloader for unloading cut material in a wagon into a conveying means, wherein the speed of unloading the wagon may be increased or decreased independently of the speed of the conveying means.

The transmission in the present instance is secured to a conveying means or feed hopper 61 as by angle shaped brackets 62 and 63 so as to position the transmission so that the driving shaft 10 is in alignment with a driving shaft 64 of the feed hopper for universal connection therewith. The conveying means or feed hopper 61 is of conventional construction and preferably of the type employed for conveying material into a blowing mechanism 65 for discharge into a silo or other place of storage but it should be understood that the feed hopper can be of any type for transferring material from one place to another. The feed hopper comprises in the present instance end and side members 66 and a floor member 67 which is designed to receive the material discharged therein by the wagon. The driving shaft 64 in the present instance is extended tranvsersely through the feed hopper and is provided with spaced sprockets 68 positioned within the feed hopper 61. Sprockets 69 aligned with above mentioned sprockets 68 are provided on a shaft 70 which in turn extends transversely through the hopper adjacent the other end thereof. Spaced chains 71 are carried by the sprockets 68 and 69 around the floor member 67 and have secured transversely therebetween blades 72 for pushing or urging the material emptied into the feed hopper toward its discharge end. The driving shaft 64 is provided laterally of the feed hopper with a sprocket 73 which is in mesh with a driving chain 74 which in turn is driven by any suitable driving mechanism not shown in the drawings.

The wagon or trailer used in conjunction with the feed hopper 61 may be of any suitable type and is shown including spaced parallel sides 75, an inclined forward wall 76, and a removable rear wall 77. Supporting brackets project downwardly from the sides 75 to support a rear axle upon which are rotatably supported rear wheels 78. Suitable brackets are likewise provided forwardly for supporting a front axle 79 for rotatably carrying front wheels 80. The wheels 80 are shown pivotally attached at 81 to the front axle 79 and arms 82 may be connected by a suitable tie-rod 83, which may be pivotally secured at 84 to the rear end of a tongue or drawbar 85. This tongue or drawbar is pivotally secured to the front axle as at 86 so that pivotal movement of the drawbar will act to pivotally move the front wheels 80.

A pair of sprocket shafts 87 and 88 extend transversely of the wagon and support sprockets 89 and 90 respectively in spaced relation and in alignment with each other. Spaced parallel chains 91 are carried around a floor member 92 by the sprockets 89 and 90. Paddles 93 are secured transversely between the chains 91 for pushing or urging the material in the wagon toward the rear end thereof for discharge into the feed hopper 61 as will be clearly explained. The sprocket shaft 87 is provided with a laterally projecting end 94, which is universally connected to a telescopic universal shaft 95 which in turn is universally connected to the driven shaft 11 of the transmission for imparting intermittent motion to the chains 91 for unloading the wagon.

For maintaining or regulating the rate of intermittent motion directed to shaft 87 of the wagon by the transmission a conventional chain 96 is provided secured to an arm 97 fixed to and extending transversely of arm 58 and held in a bracket 98 provided with a slot 99 (see Fig. 5). While the slot 99 is of sufficient size to permit one link of the chain 96 to be easily slid edgewise therein, transverse movement of said chain in said slot is prevented since the slot is not of sufficient size to permit the juncture of two links to pass therethrough. It should be further noted that a movement of the rockable arms 97 and 53 corresponding to a movement of the chain equal to the length of one link of the chain will raise or lower the control rod 54, depending upon the direction of movement of the chain, so as to increase or decrease the speed of intermittent motion transmitted by the transmission by one-half tooth of the ratchet wheel 14 per revolution of the driving cam 12, as by regulating the amount of lift imparted to the follower assembly by the driving cam assembly, as will be clear from the foregoing description.

In operation the wagon is filled with grain, cut forage, or other suitable material and backed up to the feed hopper so that the rear end of the wagon will feed into the hopper. The universal shaft 95 is then connected between the driven shaft 11 of the transmission and the end 94 of the sprocket shaft 87, the shaft 85 being telescopic to permit this to be easily done regardless of the positioning of the wagon with respect to the feed hopper. The driving sprocket 73 is then connected to the suitable driving means by the chain 74 for driving the shaft 64 and consequently moving the chains 71 downwardly as seen in Fig. 4 around the sprockets 68 and 69. The shaft 64 will consequently transmit a uniform rotative motion to the driving shaft 10 for transforming in the transmission, into intermittent motion, as has been clearly explained, for unloading the wagon. Since the pile of grain, forage, or other material is usually near the rear of the wagon when the unloading operation is first started, only a slow rate of intermittent motion is needed to cause a sliding movement of the grain, or forage into the feed hopper. However, as the load in the wagon diminishes, the chains 91 will have to be moved a greater distance so that the paddles 93 can maintain an even flow of material into the feed hopper. This is accomplished, as should be clear, by regulating the speed of the intermittent motion transmitted to the wagon by means of the regulating chain 96 as previously described.

Having now clearly described my invention, what I claim and desire to be protected by Letters Patent is:

1. In a variable speed actuating mechanism for a wagon unloader having a driven shaft, the combination of a driving shaft spaced from and transverse to said driven shaft, a cam on said driving shaft and rotatable therewith in a plane substantially normal to the axis of said driving shaft, a housing enclosing said driving shaft and cam, a cam follower in said housing and engaged with said cam and including a yoke member, a ratchet wheel on said driven shaft, a rocking lever swingably associated with said ratchet wheel and aligned in a plane parallel to the longitudinal plane of said driving shaft, a rigid member extending from the yoke and pivotally secured to the lever for rocking the lever in response to to-and-fro movement of the yoke and whereby said yoke is given a rocking movement in the direction of the axis of said driving shaft, a pawl on said lever engaged with the ratchet wheel in position to rotate it upon rocking of said lever in one direction, said housing providing spaced guiding channels extending away from said driving shaft in a direction substantially normal to said driving shaft and in the direction of the plane thereof, guide engaging elements on said follower engaged with said channels for guiding said follower in substantially parallel movement as related to the plane of said driving shaft, a cam following roller journaled in said yoke and engaged with said cam, and said roller and said cam having complementary surfaces for effective actuating contact therebetween during such rocking of said yoke.

2. In a variable speed actuating mechanism for a wagon unloader having a driven shaft, the combination of a driving shaft spaced from and transverse to said driven shaft, a cam on said driving shaft and rotatable therewith in a plane substantially normal to the axis of said driving shaft, a housing enlosing said driving shaft and cam, a cam follower in said housing and engaged with said cam and including a yoke member, a ratchet wheel on said driven shaft, a rocking lever associated with said ratchet wheel and swingable about the axis of said driven shaft, a rigid member extending from the yoke and pivotally connected to the lever for rocking the lever in response to to-and-fro movement of the yoke and whereby said yoke is given a rocking movement in the direction of the axis of said driving shaft upon said rigid member being moved by said lever about the axis of said driven shaft, a pawl on said lever engaged with the ratchet wheel in position to rotate it upon rocking of said lever in one direction, said housing providing spaced guiding channels extending away from said driving shaft in a direction substantially normal to said driving shaft and in the direction of the plane thereof, guide engaging elements on said follower engaged with said channels for guiding said follower in substantially parallel movement as related to the plane of said driving shaft, a cam following roller journaled in said yoke and engaged with said cam, and said roller being barrel-shaped for effective actuating contact with said cam during such rocking of said yoke.

3. In a variable speed actuating mechanism for a wagon unloader having a driven shaft, the combination of a driving shaft spaced from and transverse to said driven shaft, a cam on said driving shaft and rotatable therewith in a plane substantially normal to the axis of said driving shaft, a housing enclosing said driving shaft and cam, a cam follower in said housing and engaged with said cam and including a yoke member, a ratchet wheel on said driven shaft, a rocking lever associated with said ratchet wheel and swingable about the axis of said driven shaft, a rigid member extending from the yoke and pivotally connected to the lever for rocking the lever in response to to-and-fro movement of the yoke and whereby said yoke is given a rocking movement in the direction of the axis of said driving shaft upon said rigid member being moved by said lever about the axis of said driven shaft, a pawl on said lever engaged with the ratchet wheel in position to rotate it upon rocking of said lever in one direction, said housing providing substantially parallel guiding channels spaced from each other axially of and extending away from said driving shaft in planes substantially normal to the axis of said driving shaft and in the direction of the plane thereof, freely rotatable guiding elements engaged between said channels and said follower for guiding said follower in substantially parallel movement as related to the plane of said driving shaft, a cam following roller journaled in said yoke and engaged with said cam, and said roller being substantially barrel-shaped for effective actuating contact with said cam during such rocking of said yoke.

4. In a variable speed actuating mechanism for transforming rotary motion into intermittent motion, a driven shaft, a driving shaft spaced from said driven shaft and transverse with respect thereto, a cam on said driving shaft and rotatable therewith in a plane substantially normal to the axis of said driving shaft, a housing enclosing said driving shaft and said cam, a ratchet wheel on said driven shaft, a lever adjacent said ratchet wheel and swingable about the axis of said driven shaft and carrying a pawl for engagement with said ratchet wheel, a cam follower between said lever and said cam for rocking said lever upon rotation of said driving shaft, said cam follower including a yoke, and a rigid member extending from said yoke and pivotally connected to said lever, said yoke carrying a substantially barrel-shaped roller positioned to be in effective actuating contact with said cam wherein upon to-and-fro movement of said yoke said follower is given a peculiar rocking movement in the direction of the axis of said driving shaft upon said rigid member being moved by said lever about the axis of said driven shaft, said housing having formed therein guiding channels spaced on opposite sides of said cam in planes substantially normal to the axis of said driving shaft and in the direction of the plane thereof, and guides extending from said follower and engaged in the respective guiding channels for permitting said follower to move in said peculiar motion in the direction of the axis of said driving shaft while guiding said follower in substantially parallel movement as related to the direction of the plane thereof.

HOWARD E. WILTSEY.

REFERENCES CITED

The following references are of record in the file of this patent:

UNITED STATES PATENTS

| Number | Name | Date |
|---|---|---|
| 631,495 | Adams | Aug. 22, 1899 |
| 646,287 | Hundhausen | Mar. 27, 1900 |
| 883,268 | Wilson | Mar. 31, 1908 |
| 1,833,831 | Drawz | Nov. 24, 1931 |